United States Patent [19]

Arai et al.

[11] Patent Number: 4,651,216

[45] Date of Patent: Mar. 17, 1987

[54] REMOTO-CONTROLLABLE AUTOMATIC DIAPHRAGM CONTROL DEVICE FOR USE WITH CCTV CAMERA

[75] Inventors: Masayuki Arai; Terumi Ogasawara, both of Tokyo, Japan

[73] Assignee: Asahi Seimitsu Kabushiki Kaisha, Tokyo, Japan

[21] Appl. No.: 651,076

[22] Filed: Sep. 17, 1984

[30] Foreign Application Priority Data

Sep. 19, 1983 [JP] Japan ................. 58-172753

[51] Int. Cl.[4] ............................................ H04N 5/238
[52] U.S. Cl. ................................... 358/228; 358/209; 354/442; 354/443
[58] Field of Search ............... 358/228, 213, 209, 210; 354/412, 423, 429, 442, 443; 352/141

[56] References Cited

U.S. PATENT DOCUMENTS

| 4,190,864 | 2/1980 | Dischert | 358/210 |
| 4,300,167 | 11/1981 | Miller et al. | 358/228 X |
| 4,542,410 | 9/1985 | Arai et al. | 358/228 |
| 4,547,808 | 10/1985 | Arai et al. | 358/228 |
| 4,562,476 | 12/1985 | Shikano et al. | 354/412 X |
| 4,562,477 | 12/1985 | Ogasawara et al. | 358/228 |

Primary Examiner—James J. Groody
Assistant Examiner—E. Anne Toth
Attorney, Agent, or Firm—Birch, Stewart, Kolasch & Birch

[57] ABSTRACT

A remote-controllable automatic diaphragm control device for use with a CCTV camera permitting the diaphragm control to be changed over between an automatic diaphragm control mode in which a desired diaphragm control is achieved by utilizing a video signal supplied from a television camera and a remote diaphragm control mode in which the diaphragm is electrically adjustable to a desired diaphragm position entirely regardless of said video signal from the television camera, in a simple manner.

8 Claims, 9 Drawing Figures

REMOTO-CONTROLLABLE AUTOMATIC DIAPHRAGM CONTROL DEVICE FOR USE WITH CCTV CAMERA

BACKGROUND OF THE INVENTION

The present invention relates to a remote-controllable automatic diaphragm control device for use with a CCTV camera permitting the diaphragm control to be changed over between an automatic diaphragm control mode in which a desired diaphragm control is achieved by utilizing a video signal supplied from a television camera and a remote diaphragm control mode in which the diaphragm is electrically adjustable to a desired diaphragm position entirely regardless of said video signal from the television camera, in a simple manner.

As the diaphragm control device for CCTV camera which is claimed to be excellent in its responsibility reliability and economical efficiency, there has already been proposed such diaphragm control device adopting the servometer of movable magnet type of movable coil type. However, such device of prior art has been still disadvantageous in that, upon deenergization, a displacement of the diaphragm occurs due to a shock or a vibration and a mechanical countermeasure to avoid this displacement would result not only in a reduced degree of freedom for design concerning location and arrangement of the respective mechanical components but also in a poor remote control function of the device. It has also been proposed to provide the servometer with a position detector elements therein for electric remote control, but such an arrangement has been also disadvantageous in its poor manoeuvrability.

SUMMARY OF THE INVENTION

In view of these various drawbacks of prior art, the present invention provides a remote-controllable diaphragm control device for CCTV camera enabling the diaphragm control to be easily changed over by a single-wire control between an automatic diaphragm control mode in which a desired diaphragm control is achieved by utilizing a video signal supplied from a television camera and a remote diaphragm control mode in which the diaphragm is electrically adjustable to a desired diaphragm position entirely regardless of said video signal from the television camera so that the diaphragm control may be selectively performed in said automatic control mode or in said remote control mode, depending on the operating condition.

DESCRIPTION OF THE EMBODIMENT

The present invention will now be described by reference to an embodiment as shown by the accompanying drawings.

Figure 1:
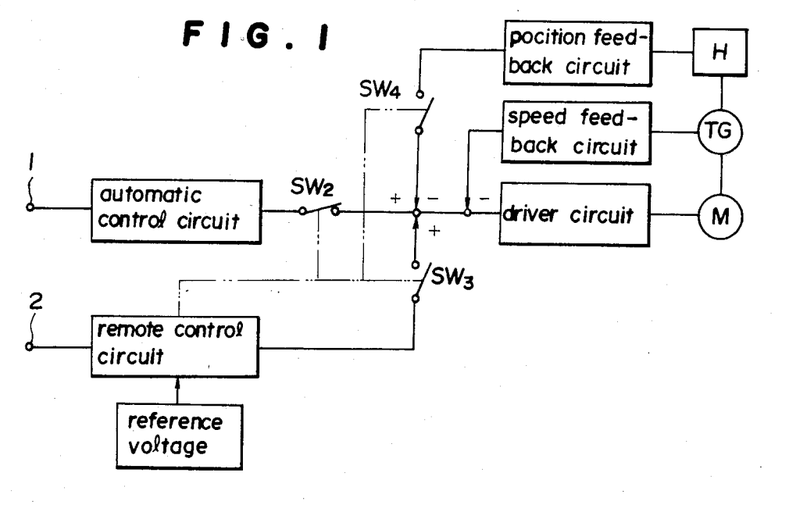
FIG. 1 is a block diagram illustrating a principle of the present invention.

FIG. 1 is a block diagram illustrating a principle of the present invention, in which reference numeral designates a video signal input terminal adapted to be applied with a video signal coming from the television camera and reference numeral 2 designates a position control signal input terminal adapted to be applied with a diaphragm position control signal during the remote control. So far as no position control signal Vm higher than a predetermined reference voltage appears on the position control signal input terminal 2, a switch Sw2 remains ON but switches Sw3 and Sw4 remain OFF, so that only a video signal Vin applied to the video signal input terminal 1 is applied through an automatic control circuit to a driver circuit and thus a motor M is driven to achieve the automatic diaphragm control.

Upon application of the position control signal Vm higher than the reference voltage to the position control signal input terminal 2, the switch Sw2 is now turned OFF and the switches Sw3 and Sw4 are turned ON, resulting in that any signal from the automatic control circuit is intercepted and the position control signal Vm is applied from a remote control circuit to the driver circuit and thereby the diaphragm control is done in the remote control mode. Since the switch Sw4 is in conductive state at this point, a position detection signal from a position detector element H provides a position feedback so that the diaphragm may be electrically fixed.

In any cases, a tachogenerator TG provides a velocity feedback to brake the motor M and thereby to maintain a diaphragm velocity constant.

Figure 2:
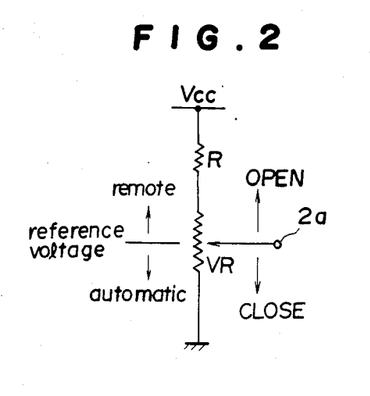
FIG. 2 is a diagram schematically illustrating means for the remote control by a single-wire control.
Figure 3:
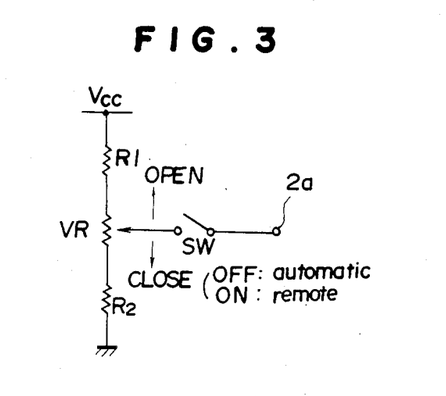
FIG. 3 is a diagram schematically illustrating the other means for the remote control by a single-wire control.

Means to operate the remote control circuit may be arranged as shown by FIGS. 2 and 3. In the case of FIG. 2, a variable resistance VR has its output terminal 2a being connected by a single wire to said position control signal input terminal 2 so that the output voltage can be adjusted to a level higher or lower than the predetermined reference voltage. Thus, the output voltage of the variable resistance VR lower than the reference voltage establishes the automatic control mode since no position control signal Vm is then applied to the position control signal input terminal 2 while said output voltage higher than the reference voltage establishes the remote control mode since the position control signal Vm is then applied to said input terminal 2. During the remote control mode, the control proceeds so that the diaphragm is opened as a resistance value of the variable resistance VR increases and stopped down as said resistance value decreases. In the case of FIG. 3, the variable resistance VR has its output voltage adjustable within a range higher than the reference voltage and there is provided between the output terminal 2a connected by the single wire to said position control signal input terminal 2 and said variable resistance VR a switch SW. With this switch being OFF, the automatic control mode is established and with this switch being ON, the position control signal Vm is applied to the position control signal input terminal 2 to regulate the resistance value of the variable resistance VR so that the diaphragm control may be achieved in the same manner as in the case of FIG. 2.

The device constructed according to the principle of the present invention as has been described hereinbefore will be considered in details with reference to an embodiment thereof. In the electric circuit diagram of FIG. 4, reference numeral 1 designates a video signal input terminal, reference numeral 2 designates a position control signal input terminal, reference numeral 3 designates a positive voltage side of a source circuit adapted to energize the circuit arrangement of the present invention, reference numeral 4 designates a ground side of said source circuit and reference numeral 5 designates a middle point voltage terminal destined to supply a middle point voltage.

Figure 4:
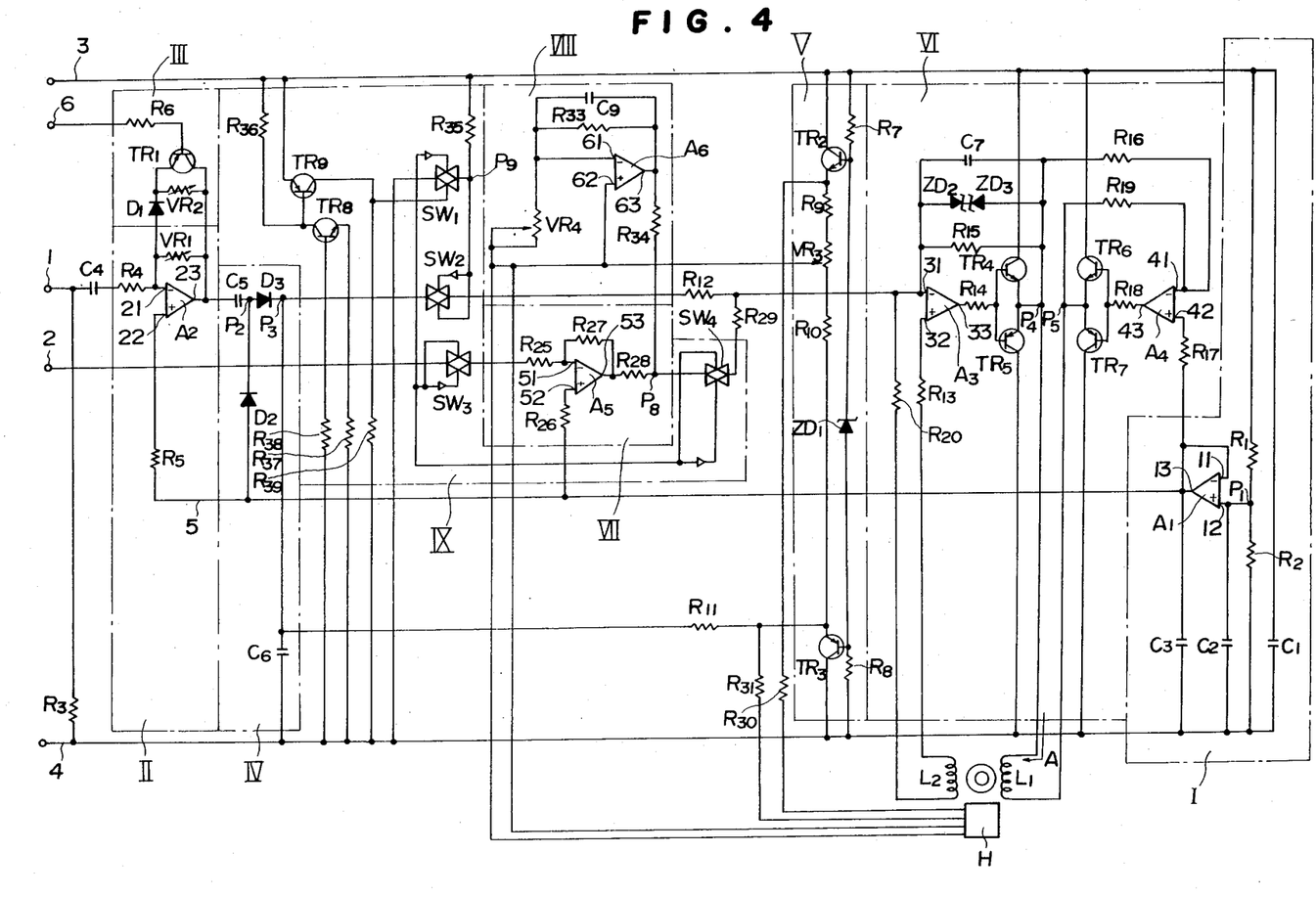
FIG. 4 is a circuit diagram illustrating an embodiment of the device constructed according to the present invention.

Reference numeral I designates a middle point voltage supplying circuit connected to said source circuit as a component of means functioning to stabilize the diaphragm control signal relative to a source voltage and adapted to supply an intermediate (preferably ½) voltage VO with respect to said source voltage Vc to said middle point voltage terminal 5. In this particular embodiment, a smoothing capacitor C1 and serial resistances R1, R2 both having a same resistance value are connected in parallel to one another between the positive voltage side 3 and the ground side 4, a junction P1 of said resistances R1, R2 being connected to a non-inverting input terminal 12 of an operational amplifier A1, an inverting input terminal 11 being directly connected to an output terminal 13 and said non-inverting input terminal 12 and said output terminal 13 being connected respectively via capacitors C2, C3 to the ground side 4 so that the voltage VO equal to ½ of the source voltage Vc appears at the middle point voltage terminal 5.

The video signal input terminal 1 is connected via a resistance R3 to the ground side 4 and via a capacitor C4 to an inverting amplifier II.

In the inverting amplifier II, an inverting input terminal 21 of an operational amplifier A2 and said capacitor C4 are connected to each other via a resistance R4 while a non-inverting input terminal 22 of said operational amplifier and the middle point voltage terminal 5 are connected to each other via a resistance R5, and there is provided between the inverting input terminal 21 and an output terminal 23 a variable resistance VR1 functioning as a feedback resistance. The inverting amplifier II inverts and amplifies the video signal Vin of which the DC component has been removed in said capacitor C4 so as to produce on its output terminal 23 an inverted signal Vac. The variable resistance VR1 may be regulated to adjust an amplification degree of the operational amplifier A2.

Figure 5:
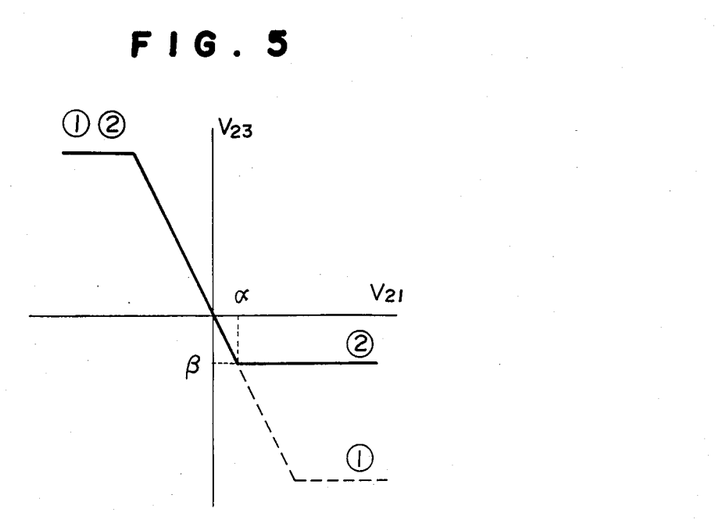
FIG. 5 is a diagram schematically illustrating characteristics of a limiter circuit.

Reference numeral III designates a limiter circuit adapted to limit a negative side output of the video signal inverted and amplified by the operational amplifier A2 and connected in parallel to said variable resistance VR1. The limiter circuit III consists of a diode D1, a variable resistance VR2 destined to control electric current flowing through said diode D1, and a switching transistor TR1, in which the inverting input terminal 21 of the operational amplifier A2 is connected to an anode of the diode D1 of which the cathode is connected via the variable resistance VR2 to the output terminal 23. For a remote manipulation, there is provided in parallel to said variable resistance VR2 a transistor TR1 of which the base is connected via a resistance R6 to a remote terminal 6. This limiter circuit III is arranged, as shown by solid line ②in FIG. 5, so that the negative side of the output voltage from the operational amplifier A2 has input/output characteristics forcibly suppressed by the diode. Referring to FIG. 5, the abscissa represents an input voltage V21 at the inverting input terminal 21 of the operational amplifier A2 and the ordinate represents the output voltage V23 at the output terminal 23. FIG. 5 indicates that the output voltage V23 is maintained constant at $\beta$ under the effect of the limiter circuit when the input voltage V21 is higher than $\alpha$. Broken line ① corresponds to normal characteristics.

Reference numeral IV designates a rectifier adapted for voltage doubling rectification of the inverted signal Vac obtained in said inverting amplifier II, consisting of a voltage doubling capacitor C5 connected to the output terminal 23 of said operational amplifier A2 and a diode D2 via which an output terminal P2 of said capacitor C5 is connected to the middle point voltage terminal 6. A diode D3 is forwardly connected to the output terminal P2 of said capacitor C5 so that a rectified signal Vdc appears on an output terminal P3. Reference numeral C6 designates a capacitor adapted to smooth said rectified signal Vdc. In this embodiment, the automatic control circuit is constituted from the inverting amplifier II, the limiter III and the voltage doubling rectifier IV as has been set forth above.

Reference numeral V designates a stabilizer adapted to stabilize said rectified signal Vdc relative to the source voltage and corresponding to a circuit established by a resistance R7, a Zener diode ZD1 and a resistance R8 successively connected in this order between the positive voltage side 3 and the ground side 4 of the source circuit. Base terminals of current amplifying transistors TR2, TR3 are connected between said resistance R7 and said Zener diode and between said Zener diode ZD1 and said resistance R8, respectively. Collector terminal of said transistor TR2 is connected to the positive voltage side of said source circuit, emitter terminal thereof is connected via a resistance R9, a variable resistance VR3 and a resistance R10 to emitter terminal of the transistor TR3, and collector terminal of the latter is earthed to the ground side 4. Emitter terminal of the transistor TR3 is connected via a resistance R11 to an output terminal P3 of the voltage doubling rectifier IV so that the rectified signal Vdc is levelshifted towards the negative side by a predetermined voltage and a behaviour range of said rectified signal Vde covers both the positive side and the negative side of the middle point voltage VO.

This stabilizer V continues, during the remote control, to supply a power for stabilization of the voltage to drive the position detector element in order to prevent the diaphragm from being affected by a variation in the source voltage.

Reference numeral VI designates a diaphragm drive circuit adapted to compare the rectified signal Vdc from the voltage doubling rectifier IV with the middle point voltage and to drive the diaphragm in accordance wtih a result of th comparison. In the diaphragm drive circuit VI, an inverting input terminal 31 of an operational amplifier A3 is connected via a switch Sw2 and a resistance R12 to the output terminal P3 of the voltage doubling rectifier IV while a non-inverting input terminal 32 is connected via a resistance R13 to the middle point voltage terminal 5, and an output terminal 33 is connected via a resistance R14 to bases of the transistors TR4, TR5. The transistor TR4 functions as a switching element adapted to become conductive when its base voltage exceeds a predetermined value while the transistor TR5 functions as a switching element adapted to become conductive when its base voltage drops beyond the predetermined value. The transistor TR4 has its collector terminal connected to the positive side 3 of the source circuit and its emitter terminal connected to the emitter terminal of the transistor TR5. The transistor TR5 has its collector terminal connected to the ground side 4. To eliminate non-responsive ranges of these switching transistors TR4, TR5, there is provided between the emitter terminal P4 and the inverting input terminal 31 a feedback resistance R15 in parallel to which a pair of opposing Zener diodes ZD2, ZD3 and a capacitor C7 are connected.

Said emitter terminal P4 is connected via a resistance R16 to an inverting input terminal 41 of an operational amplifier A4, a non-inverting input terminal 42 is connected via a resistance R17 to the middle point voltage terminal 5, and an output terminal 43 is connected via a resistance R18 to the bases of transistors TR6, TR7. The transistor TR6 has its collector terminal connected to the positive side 3 of the source circuit and its emitter terminal connected to the emitter terminal of the transistor TR7. The transistor TR7 has its collector terminal connected to the ground side 4. To eliminate non-responsive ranges of these switching transistors TR6, TR7, there is provided between the emitter terminal P5 and the inverting input terminal 41 of the operational amplifier A4 a feedback resistance R19.

Between said both emitter terminals P4, P5 there is provided a diaphragm driving coil L1 functioning as the motor M adapted to open the diaphragm when the current flows in the direction as indicated by an arrow A. Further, there is provided between the inverting input terminal 31 of the operational amplifier A3 and the middle point voltage terminal 5 a braking coil L2 functioning to control a velocity of the diaphragm by means of a serial resistance R20 and this braking coil L2 is provided in the form of the tacho-generator TG.

Reference numeral VII designates a position control signal inverter which inverts and amplifiers the position control signal Vm applied from the position control signal input terminal 2. In this position control signal inverter VII, said position control signal input terminal 2 is connected via a switch Sw3 and a resistance R25 to an inverting input terminal 51 of an operational amplifier A5, a non-inverting input terminal 52 is connected via a resistance R26 to the middle point voltage terminal 5, and there is provided between said inverting input terminal 51 and an output terminal 53 a feedback resistance R27. The output terminal 53 of the inverter VII is connected via a resistance R28, a switch Sw4 and a resistance R29 to the inverting input terminal 31 of the operational amplifier A3 associated with the driver circuit VI so that the diaphragm may be driven with an inverted signal corresponding to the position control signal Vm.

Reference numeral VIII designates a detective amplifier which detects a diaphragm position in the remote control mode and electrically fixes the diaphragm under a feedback based on the detection signal. In the embodiment, a Hall effect element of two input/two output is adopted as a diaphragm position detector element H. Input voltage of said Hall effect element H is supplied from the stabilizer V. One input (of positive side) is applied through a resistance R30 from the emitter terminal of the current amplifying transistor TR2 while the other input (of negative side) is applied through a resistance R31 from the emitter terminal of the transistor TR3. One output terminal of the Hall effect element H is connected via a variable resistance VR4 and a resistance R32 to an inverting input terminal 61 of an operational amplifier A6 while the other output terminal is connected to a non-inverting input terminal 62 of the operational amplifier A6. To accommodate a variation in the output signal due to a possible unevenness and/or a possible deviation in mounting location of the position detector element, it is arranged so that such variation may be compensated by adjustably connecting the variable terminal of the variable resistance VR3 to the non-inverting input terminal 62 of the operational amplifier A6. Between the output terminal 63 and the inverting input terminal 61 of the operational amplifier A6, there is provided a feedback resistance R33 in parallel to which a capacitor C9 is connected. The output terminal 63 of this operational amplifier A6 is connected via a resistance R34 to a point P8 of the position control signal inverter VII so that the detection signal obtained at said output terminal 63 may be feedback to the position control signal. The remote control circuit consists of said inverter VII and said detective amplifier VIII.

Reference numeral IX designates a switching circuit for change-over between the automatic control mode and the remote control mode. In this switching circuit IX, Sw1, Sw2, Sw3, Sw4 represent analog switches adapted to be activated with a predetermined impression voltage, among which the switch Sw2 reversely functions, i.e., when the switch Sw2 is ON, the rest switches are OFF and when the switch Sw2 is OFF, the rest switches are ON. The switch Sw1 is the one which reversely activates the switch Sw2 and in a section comprising a resistance R35 via which the positive voltage side 3 is connected to the ground side 4 of the source circuit, establishes conduction or interception between a point P9 and the ground side 4 so as to vary the impression voltage of the switch Sw2. The switch Sw2 is adapted to establish conduction or interception between the output terminal P3 of the rectifier IV and the driver VI, the switch Sw3 is adapted to establish conduction or interception between the position control signal input terminal 2 and the input terminal 51 of the inverter VII, and the switch Sw4 is adapted to establish conduction or interception between the point P8 of the inverter VII and the input terminal 31 of the driver VI. To apply the respective analog switches with the impression voltage, the positive voltage side 3 and the ground side 4 of the source circuit are connected to each other via a resistance R36, a switching transistor TR8 and a resistance R37, the base terminal of said transistor TR8 is connected to the position control signal input terminal 2 and earthed via a resistance R38. The positive voltage side 3 and the ground side 4 are connected to each other also via another switching transistor TR9 and a resistance R39 and the base terminal of said transistor TR9 is connected to the collector terminal of said transistor TR8. The switches Sw1, Sw3, Sw4 are applied with the impression voltage from the collector terminal of said transistor TR9 while the switch Sw2 is applied with the impression voltage via the resistance R35 and the point P9 from the positive voltage side 3 of the source circuit.

The embodiment of the present invention of the arrangement as has been described hereinabove functions as follows:

So long as the position control signal input terminal 2 is applied with no position control signal Vm higher than a predetermined reference voltage, the transistor TR8 has its base potential being earthed and the collector-emitter section being OFF while the transistor TR9 has its base potential being equal to the source voltage and the collector-emitter section being OFF. In consequence, the collector terminal of the transistor TR9 takes a potential O, the switches Sw1, Sw3, Sw4 are OFF, the point P7 takes a potential equal to the source voltage and the switch Sw2 is ON. Thus, the device according to the present invention functions, in this condition, as the automatic control circuit utilizing the video signal.

Figure 6:
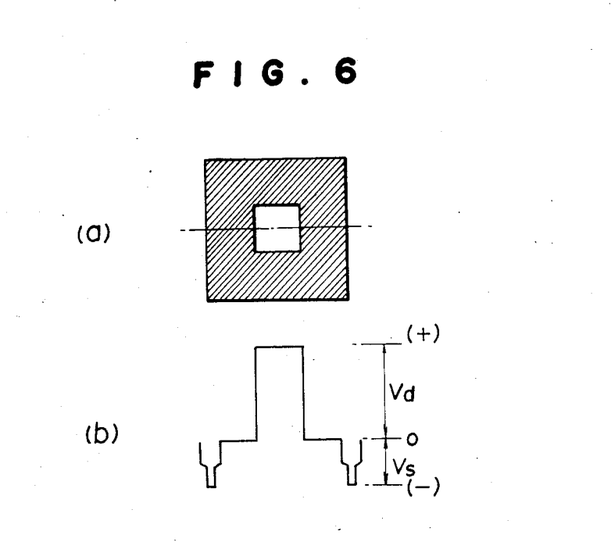
FIG. 6 illustrates a relationship between an object to be picked up and a video signal.
Figure 7:
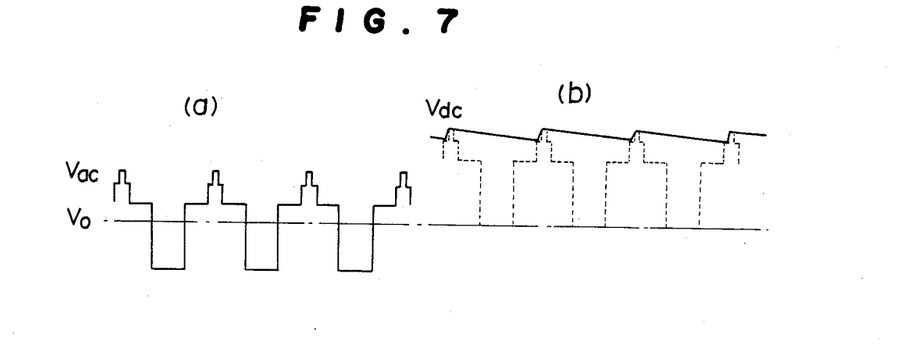
FIGS. 7 through 9 schematically illustrate input signal waveforms and corresponding output signal waveforms at respective circuit stages.

Assumed that the video signal input terminal 1 is applied, as illustrated by the test chart of FIG. 6 (a), with a video signal Vin of a waveform as shown by FIG. 6(b). In this waveform, a rectangular area on the positive side corresponds to a bright area in the picture, Vd and Vs represent a video level and a synchronous level. This video signal Vin is inversely amplified by the inverting amplifier II as shown by FIG. 7(a) and an inverted signal Vac appears on the output terminal 23 of said inverting amplifier II. This inverted signal Vac has its DC component eliminated by the capacitor C4 and, as a result, is in a steady state, i.e., the inverted signal Vac has positive and negative areas which are equal to each other with respect to the middle point voltage VO. The amplification degree of the inverting amplifier II increases as the variable resistance VR1 is regulated to increase its resistance value and decreases as said variable resistance VR1 is regulated to reduce its resistance value. By regulating the amplification degree in this manner, the amplitude of the inverted signal Vac is regulated. Specifically, the amplification degree may be reduced when the video signal Vin coming from the television camera is too high and increased when the video signal Vin is too low. Thereby a desired sensitivity adjustment is achieved to obtain a diaphragm control signal providing the optimum picture.

Adjustment of the variable resistance VR2 associated with the limiter III or input of a remote voltage to the remote terminal 6 permits the control mode to be adjusted depending on a ratio of brightness and darkness in an outdoor scene or like, in which mode a brighter area should be selected as a main object to be picked up or a darker area should be selected as a main object to be picked up.

When the variable resistance VR2 takes its resistance value infinite, the inverted signal Vac takes a waveform corresponding to an inverted video signal Vin as seen in FIG. 7(a), since then the limiter III is not activated. Input of this inverted signal Vac to the capacitor C5 of the voltage doubling rectifier IV causes a negative portion of the inverted signal Vac to turn the diode D2 on, initiating the capacitor C5 to be charged, and a subsequent positive portion is added to the previously charged voltage. Thus, a voltage doubled signal VP2 appearing on the point P2 is DC-regenerated as the DC voltage having the same amplitude as seen in FIG. 7(b). Thus, the voltage doubled signal VP2 of the initial amplitude is obtained, so the mode of light measuring is set to the mode in which the video level Vd is detected and the brighter area is selected as the main object to be picked up.

Figure 8:
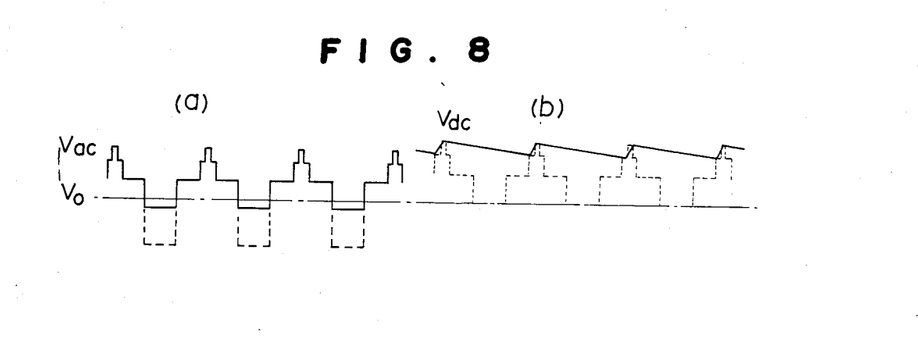

In the case where the resistance value of the variable resistance VR2 in the limiter III is adjusted to O, the diode D1 becomes conductive and the operational amplifier A2 is subjected to the limitation as shown in FIG. 5. More specifically, when the video signal Vin passes through the capacitor C4 and applied to the inverting amplifier II, the brighter area is clipped and the inverted signal Vac having no portion indicated by a broken line is formed. Rectification of this inverted signal Vac by the voltage doubling rectifier IV results in a DC regeneration as shown by FIG. 8(b) in the same manner as in the previously mentioned control mode. That is, the voltage doubled signal VP2 is determined not by the amplitude of the video signal Vin but a value substantially corresponding to an average value of the whole area of the object to be picked up having its negative portion of the signal clipped away. The above-mentioned operation is the average light measuring control mode in which the darker area is used as the main object to be picked up. By adjusting said variable resistance VR2 to an intermediate resistance value, the light measuring mode is converted to a mode intermediate of said two light measuring modes. Input of the remote voltage to the remote terminal 6 causes the switching transistor TR1 to be turned ON and the diode D1 to become conductive, subjecting the operational amplifier A2 to limitation. Thus, it is possible by utilizing the remote terminal 6 to control whether the brighter area should be selected or the darker area should be selected as the main object to be picked up.

Figure 9:
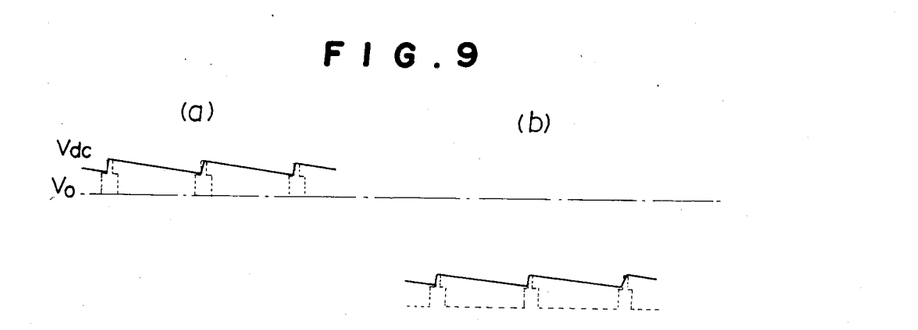

The rectified signal Vdc which has passed through said voltage doubling rectifier IV corresponds to the voltage doubled signal VP2, but the video signal Vin originally involves the synchronous level Vs so that the rectified signal Vdc is on the positive side with respect to the middle point voltage VO as seen in FIG. 9(a), even when the object is of the darkest condition. However, the device of the present invention should be activated on both sides of the middle point voltage VO. To achieve this, the present invention provides a unique adjustment such that the rectified signal is lowered by a predetermined voltage towards the negative side to make the video signal corresponding to the darker object negative with respect to the middle point voltage VO. Thus, the rectified signal Vdc will have its waveform on the negative side as seen in FIG. 9(b), i.e., a darker video signal Vin will surely be lower than the middle point voltage VO. In this way, the rectified signal Vdc can have its same ranges of behaviour both on the positive side and on the negative side with respect to the middle point voltage VO.

This rectified signal Vdc is applied to the inverting input terminal 31 of the operational amplifier A3. Upon this application, the input voltage V31(Vdc) will have a level corresponding to the reference voltage and the output voltage V33=VO for the optimum picture condition, so that both the transistors TR4, TR5 are not activated and, therefore, no current flows through the driving coil L1.

For a relatively bright object to be picked up, i.e., when the input voltage V31<VO, this input voltage V31 is inversely amplified by the operational amplifier A3 with respect to the middle point voltage into the output voltage V33<VO. As a result, the collector-emitter section of the transistor TR5 is now conductive and the voltage VP4<VO appears on the emitter terminal P4. When this voltage VP4 is inversely amplified again by the operational amplifier A4 with respect to the middle point voltage VO and the output voltage V43>VO appears on the output terminal 42 of said operational amplifier A4, the collector-emitter section of the transistor TR6 becomes conductive. Once the transistors TR5, TR6 have been turned to their conductive states in this manner, the current flows in the direction opposed to that as indicated by an arrow A from the positive voltage side 3 of the source circuit through the transistor TR6 to the diaphragm driving coil L1 which is, in turn, activated to close the diaphragm.

For a relatively dark object to be picked up, on the contrary, i.e., in the case of the input voltage V31<VO, this input voltage V31 is inversely amplified by the operational amplifier A3 with respect to the middle point voltage VO to produce the output voltage V33>VO on the output terminal 33 of said operational amplifier A3 and the collector-emitter section of the transistor TR4 becomes conductive, producing the voltage VP4>VO on the emitter terminal P4. When this voltage VP4 is inversely amplified again by the operational amplifier A4, the output voltage V43>VO appears on the output terminal 43 of this operational amplifier A4 and the collector-emitter section of the transistor TR7 becomes conductive. Once the transistors TR4, TR7 have become conductive in this manner, the current flows in the direction as indicated by said arrow A from the positive voltage side 3 of the source circuit through the transistor TR4 to the diaphragm driving coil L1 which is, in turn, activated to open the diaphragm.

Such closing and opening movement of the diaphragm induces an electromotive force in the braking coil L2 and this electromotive force may be fed back to the inverting input terminal 31 of the operational amplifier A3 to prevent the diaphragm from oscillating and thereby to maintain the closing and opening movement at a constant velocity.

The manner in which the device according to the present invention operates in the automatic control mode has been described hereinabove. Now the manner of operation in the remote control mode will be described.

When the position control signal Vm applied to the position control signal input terminal 2 exceeds the reference voltage, the collector-emitter sections of the respective transistors TR8, TR9 become conductive and the switches Sw1, Sw3, Sw4 are turned ON, since these switches are then applied with the impression voltage. Turning of the switch Sw1 ON causes P7 to be earthed and, as a result, the switch Sw2 is turned OFF. Thus, the automatic control circuit utilizing the video signal Vin is now intercepted and the remote control circuit utilizing the position control signal Vm is established.

The position control signal Vm applied to the position control signal input terminal 2 is inversely amplified in the inverter VII with respect to the middle point voltage VO.

In response to the position control signal Vm applied to the position control signal input terminal 2, the output voltage $V53 = -Vm$ appears on the output terminal of the operational amplifier A5 and the output signal of the Hall effect element H is amplified by the operational amplifier A6 in the detective amplifier VIII to produce the detection signal Vh on the output terminal 63 of said operational amplifier A6. These $-Vm$ and Vh are applied to the driver circuit VI so as to drive the diaphragm until a relation $Vh+(-Vm)=VO$ is established.

In the case of the position control signal Vm>Vh, the transistors TR4, TR7 become conductive in the driver circuit VI and the ciaphragm is driven to open until Vm=Vh is established.

In the case of the position control signal Vm Vh, the transistors TR5, TR6 become conductive in the driver circuit VI and the diaphragm is driven to close until Vm=Vh is established.

As will be obviously understood from the aforegoing description, the present invention provides the diaphragm control device for use the CCTV camera including the automatic diaphragm control means for the diaphragm control mode utilizing the video signal coming from the television camera and the remote control means adapted for electrical adjustment of the diaphragm to a desired diaphragm position independently of said video signal, wherein not only the remote diaphragm control but also the change-over between said automatic diaphragm control means and said remote diaphragm control means are single-wire controllable by regulating the level of the position control signal voltage with respect to the predetermined reference voltage. This feature is effective to facilitate the remote manipulation with a simplified arrangement. The other important feature of the present invention lies in that there is provided the stabilizer means adapted for stabilization of the control signal obtained by said automatic diaphragm control means and the detection signal feedback from the position detector element in said remote diaphragm control means with respect to the source voltage so that the diaphragm value once adjusted under a given source voltage can be maintain constant. This feature is effective to permit the diaphragm to be electrically fixed and thereby the diaphragm even when the latter has been displaced due to a shock or a viabration to restore its initial position at once.

What is claimed is:

1. A remote-controllable automatic diaphragm control device for use with a CCTV camera including automatic diaphragm control means adapted for diaphragm control utilizing a video signal coming from a television camera and remote diaphragm control means adapted for electrical adjustment of the diaphragm to a desired diaphragm position independently of said video signal, said diaphragm control device comprising:
    a driver circuit adapted to drive a diaphragm drive motor to open and close the diaphragm;
    an automatic control circuit to apply said driver circuit with a control signal based on the video signal coming from the television camera;
    a remote control circuit to apply said driver circuit with a diaphragm position control signal exclusively for the remote diaphragm control; and
    a switching circuit for selective connection of said automatic control circuit or said remote control circuit to said driver circuit depending on the position control signal applied to said remote control circuit whether it is higher or lower than a predetermined reference voltage.

2. A diaphragm control device for use with a CCTV camera according to claim 1, wherein said switching circuit connects the automatic control circuit to said driver circuit when the position control signal voltage applied to the remote control circuit is lower than the predetermined reference voltage and connects the remote control circuit to said driver circuit when said position control signal voltage is higher than the predetermined reference voltage.

3. A diaphragm control device for use with a CCTV camera according to claim 1, wherein said driver circuit drives the diaphragm drive motor to open the diaphragm as the position control signal voltage rises and drives the diaphragm drive motor to close the diaphragm as said position control signal voltage drops, when said position control signal voltage is higher than the predetermined reference voltage.

4. A diaphragm control device for use with a CCTV camera according to claim 1, further comprising
   a source of said position control signal, said source being at a voltage regulated within a range of voltage higher than the predetermined reference voltage;
   a single-wire line connecting said source to the remote control circuit; and
   a switch inserted into said single-wire line, and wherein the automatic diaphragm control means is constituted when said switch is OFF and the remote diaphragm control means is constituted when said switch in ON.

5. An automatic diaphragm device for use with a CCTV camera according to claim 1, further comprising
   a velocity feedback circuit in the form of tachogenerator adapted to brake the diaphragm drive motor with respect to said driver circuit and thereby to maintain a diaphragm velocity constant.

6. A remote-controllable automatic diaphragm control device for use with a CCTV camera including automatic diaphragm control means adapted for diaphragm control utilizing a video signal coming from a television camera and remote diaphragm control means adapted for electrical adjustment of the diaphragm to a desired diaphragm position independently of said video signal, said dia phragm control device comprising:
   a driver circuit adapted to drive a diaphragm drive motor to open and close the diaphragm;
   an automatic control circuit to apply said driver circuit with a control signal based on the video signal coming from the television camera;
   a remote control circuit to apply said driver circuit with a diaphragm position control signal exclusively for the remote diaphragm control;
   a position feedback circuit to detect a position to which the diaphragm has been driven by the diaphragm drive motor and thereby to electrically fix the diaphragm; and
   a switching circuit for selective connection of said automatic control circuit or said remote control circuit to said driver circuit depending on the position control signal applied to said remote control circuit whether it is higher or lower than a predetermined reference voltage and further for connection of said position feedback circuit to the driver circuit only when said driver circuit is connected to the remote control circuit.

7. A diaphragm control device for use with a CCTV camera according to claim 6, wherein said position feedback circuit includes a diaphragm detector element in the form of Hall effect element.

8. A remote-controllable automatic diaphragm control device for use with a CCTV camera including automatic diaphragm control means adapted for diaphragm control utilizing a video signal coming from a television camera and remote diaphragm control means adapted for electrical adjustment of the diaphragm to a desired diaphragm position independently of said video signal, said diaphragm control device comprising:
   a driver circuit adapted to drive a diaphragm drive motor to open and close the diaphragm;
   an automatic control circuit to apply said driver circuit with a control signal based on the video signal coming from the television camera;
   a remote control circuit to apply said driver circuit with a diaphragm position control signal exclusively for the remote diaphragm control;
   a position feedback circuit to detect a position to which the diaphragm has been driven by the diaphragm drive motor and thereby to electrically fix the diaphragm;
   a switching circuit for selective connection of said automatic control circuit or said remote control circuit to said driver circuit depending on the position control signal applied to said remote control circuit whether it is higher or lower than a predetermined reference voltage and further for connection of said position feedback circuit to the driver circuit only when said driver circuit is connected to the remote control circuit; and
   a stabilizer for stabilization of a control signal obtained by said automatic diaphragm control means and a detection signal feedback from a position detector element in said remote diaphragm control means with respect to a source voltage so that the diaphragm value once adjusted under a given source voltage may be maintained constant.

* * * * *